(12) United States Patent
Ur et al.

(10) Patent No.: US 9,764,712 B2
(45) Date of Patent: Sep. 19, 2017

(54) SENSOR DATA ANOMALY DETECTOR

(71) Applicant: EMPIRE TECHNOLOGY DEVELOPMENT LLC, Wilmington, DE (US)

(72) Inventors: Shmuel Ur, Galil (IL); David Hirshberg, Haifa (IL); Shay Bushinsky, Ganei-Tikva (IL); Vlad Grigore Dabija, Mountain View, CA (US); Ariel Fligler, Hod-Hasharon (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/117,375

(22) PCT Filed: Apr. 9, 2014

(86) PCT No.: PCT/US2014/033501
§ 371 (c)(1),
(2) Date: Aug. 8, 2016

(87) PCT Pub. No.: WO2015/156795
PCT Pub. Date: Oct. 15, 2015

(65) Prior Publication Data
US 2017/0008487 A1    Jan. 12, 2017

(51) Int. Cl.
*B60Q 1/00* (2006.01)
*B60R 25/102* (2013.01)
(Continued)

(52) U.S. Cl.
CPC ......... *B60R 25/102* (2013.01); *B60W 50/045* (2013.01); *G06F 21/554* (2013.01);
(Continued)

(58) Field of Classification Search
None
See application file for complete search history.

(56) References Cited

U.S. PATENT DOCUMENTS 7,120,797 B2   10/2006  Wheeler
8,090,949 B2    1/2012  Bellur et al.
(Continued)

FOREIGN PATENT DOCUMENTS

EP    1596529 B1    12/2007

OTHER PUBLICATIONS

Alattar, M., et al., "Trust-Enabled Link Spoofing Detection in MANET," Proceedings of the 2012 32nd International Conference on Distributed Computing Systems Workshops, pp. 237-244 (2012).
(Continued)

*Primary Examiner* — Adolf Dsouza
(74) *Attorney, Agent, or Firm* — Moritt Hock & Hamroff LLP; Steven S. Rubin, Esq.

(57) ABSTRACT

Methods and systems are provided that are effective to generate an alarm for a vehicle. The methods include receiving, by a device, a first sensor value from a first sensor for the vehicle. The methods further include receiving, by the device, a second sensor value from a second sensor for the vehicle. The methods further include retrieving, by the device, an instruction from a memory disposed in the vehicle while the memory is in a write-protected mode. The methods further include evaluating, by the device, the first sensor value and the second sensor value based on the instruction. The methods further include determining, by the device, that the first sensor value is outside a range associated with the first sensor based on the evaluation. The methods further include transforming, by the device, the determination into an alarm.

19 Claims, 7 Drawing Sheets

(51) Int. Cl.
| | |
|---|---|
| *B60W 50/04* | (2006.01) |
| *G06F 21/55* | (2013.01) |
| *G06F 21/57* | (2013.01) |
| *G08B 21/18* | (2006.01) |
| *B60W 50/00* | (2006.01) |
| *B60W 50/02* | (2012.01) |
| *G01R 31/28* | (2006.01) |

(52) U.S. Cl.
CPC ......... *G06F 21/577* (2013.01); *G08B 21/182* (2013.01); *B60W 2050/0005* (2013.01); *B60W 2050/0089* (2013.01); *B60W 2050/0215* (2013.01); *G01R 31/2829* (2013.01)

(56) References Cited

U.S. PATENT DOCUMENTS

| | | |
|---|---|---|
| 8,311,726 B2 | 11/2012 | Patel et al. |
| 8,311,730 B2 | 11/2012 | Neff |
| 8,315,757 B2 | 11/2012 | Yamamura et al. |
| 8,359,643 B2 | 1/2013 | Low et al. |
| 8,397,063 B2 | 3/2013 | DiCrescenzo |
| 2003/0204734 A1 | 10/2003 | Wheeler |
| 2005/0154914 A1 | 7/2005 | Eguchi et al. |
| 2006/0020380 A1 | 1/2006 | Saito et al. |
| 2006/0075222 A1 | 4/2006 | Moloney et al. |
| 2006/0179311 A1 | 8/2006 | McCorkle et al. |
| 2006/0253236 A1 | 11/2006 | Hawkins et al. |
| 2007/0013497 A1* | 1/2007 | Watanabe ............. B60Q 9/008 340/435 |
| 2007/0106430 A1* | 5/2007 | Goto ........................ G06F 8/64 701/1 |
| 2008/0133761 A1 | 6/2008 | Polk |
| 2008/0240440 A1 | 10/2008 | Rose et al. |
| 2008/0244271 A1 | 10/2008 | Yu |
| 2008/0301776 A1 | 12/2008 | Weatherford |
| 2009/0096599 A1* | 4/2009 | Kranz .................. B60C 23/009 340/459 |
| 2009/0150562 A1 | 6/2009 | Kim et al. |
| 2010/0069067 A1 | 3/2010 | Vanderveen et al. |
| 2011/0023097 A1 | 1/2011 | McDiarmid et al. |
| 2011/0321145 A1 | 12/2011 | Shimotono |
| 2012/0151566 A1 | 6/2012 | Lin et al. |
| 2012/0166514 A1 | 6/2012 | Mathew |
| 2013/0152128 A1 | 6/2013 | Tanna et al. |
| 2013/0232565 A1 | 9/2013 | O'Connor et al. |
| 2014/0026193 A1 | 1/2014 | Saxman et al. |
| 2014/0150080 A1 | 5/2014 | Miller et al. |
| 2014/0165191 A1 | 6/2014 | Ahn et al. |
| 2015/0052352 A1 | 2/2015 | Dolev et al. |
| 2015/0055504 A1 | 2/2015 | Bellamkonda et al. |

OTHER PUBLICATIONS

Bhaya, W.S., and Alasadi, S.A., "Security against Spoofing Attack in Mobile Ad Hoc Networks," European Journal of Scientific Research, vol. 64, No. 4, pp. 634-643 (2011).

International Search Report and Written Opinion for International Application No. PCT/US2014/033501, mailed on Jan. 9, 2015, 13 pages.

International Search Report and Written Opinion for International Application No. PCT/US2014/017383, mailed on Jun. 2, 2014, 35 pages.

Jansen, W. and Karygiannis, T., "Privilege Management of Mobile Agents," National Information System Security Conference, pp. 1-9 (2000).

Jiménez, W., et al., "Authentication Services in Mobile Ad-hoc Networks," accessed at https://www.google.co.in/url?sa=t&rct=j&q=&esrc=s&source=web&cd=6&cad=rja&uact=8&ved=0ahUKEwianf3D0sfNAhXJto8KHcEvDvAQFghHMAU&url=https%3A%2F%2Fportal.telecom-bretagne.eu%2Fpubli%2Fpublic%2Fdownload.jsp%3Fid_publication%3D8678&usg=AFQjCNFcZEX0KGYYljK-awitjFYEDwYXzA , TELECOM & Management SudParis. Département LOR, accessed on Jun. 27, 2016, pp. 41.

Jingle, D.J. and Rajsingh, E. B., "Defending IP Spoofing Attack and TCP SYN Flooding Attack in Next Generation Multi-hop Wireless Networks," International Journal of Information & Security (IJINS), vol. 2, No. 2, pp. 160-166 (Apr. 2013).

Lee, T.B., "Innovation vs. Safety in Self-driving Technologies," accessed at http://web.archive.org/web/20130831214856/https://freedom-to-tinker.com/blog/tblee/innovation-vs-safety-self-driving-technologies/, Nov. 11, 2008, pp. 6.

Li, F. and Wu, J., "Frame: An Innovative Incentive Scheme in Vehicular Networks," IEEE International Conference on Communications, pp. 1-6 (2009).

Pinto, C., "How Autonomous Vehicle Policy in California and Nevada Addresses Technological and Non-Technological Liabilities," Intersect: The Stanford Journal of Science, Technology and Society, vol. 5, No. 1, pp. 1-16 (2012).

Raya, M. and Hubaux, J.-P., "Securing vehicular ad hoc networks," Journal of Computer Security, vol. 15, pp. 39-68 (2007).

* cited by examiner

SENSOR DATA ANOMALY DETECTOR

CROSS REFERENCE TO RELATED APPLICATION

This application is a U.S. National Stage filing under 35 U.S.C. §371 of International Application Ser. No. PCT/US2014/033501 filed on Apr. 9, 2014. The disclosure of International Application Ser. No. PCT/US2014/033501 is hereby incorporated by reference in its entirety.

BACKGROUND

Unless otherwise indicated herein, the materials described in this section are not prior art to the claims in this application and are not admitted to be prior art by inclusion in this section.

A vehicle may include one or more sensors. The one or more sensors may be configured to collect sensory data and convert the collected sensory data into sensor values. The sensor values may be used by a processor of the vehicle to execute processes relating to operations of the vehicle.

SUMMARY

In some examples, methods are generally described to generate an alarm for a vehicle. The methods may include receiving, by a device, a first sensor value from a first sensor for the vehicle. The methods may further include receiving, by the device, a second sensor value from a second sensor for the vehicle. The methods may further include retrieving, by the device, an instruction from a memory disposed in the vehicle while the memory is in a write-protected mode. The methods may further include evaluating, by the device, the first sensor value and the second sensor value based on the instruction. The methods may further include determining, by the device, that the first sensor value is outside a range associated with the first sensor based on the evaluation. The methods may further include transforming, by the device, the determination into an alarm.

In some examples, systems are generally described to generate an alarm for a vehicle. The systems may include a memory, a first sensor for the vehicle, a second sensor for the vehicle, and a processor. The processor may be configured to be in communication with the memory, the first sensor, and the second sensor. The processor may be configured to perform or cause a device to perform retrieve an instruction from the memory while the memory is in a write-protected mode. The processor may be further configured to perform or cause the device to perform evaluate a first sensor value from the first sensor and a second sensor value from the second sensor based on the instruction. The processor may be further configured to perform or cause the device to perform determine that the first sensor value is outside a range associated with the first sensor based on the evaluation. The processor may be further configured to perform or cause the device to perform transform the identification into an alarm.

In some examples, devices are generally described to generate an alarm for a vehicle. The devices may include a memory and a processor. The processor may be configured to be in communication with the memory. The processor may be configured to perform or cause the device to perform, in response to an instruction from the memory while the memory is in a write protected mode, evaluate a first sensor value from a first sensor for the vehicle and a second sensor value from a second sensor for the vehicle. The processor may be further configured to perform or cause the device to perform determine the first sensor value is outside a range associated with the first sensor based the evaluation. The processor may be further configured to perform or cause the device to perform transform the determination into an alarm to indicate that the first sensor value is an anomaly.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to sensor data anomaly detection.

Briefly stated, technologies are generally described for methods and systems effective to generate an alarm for a vehicle. Example methods may include receiving, by a device, a first sensor value from a first sensor for the vehicle. The methods may further include receiving, by the device, a second sensor value from a second sensor for the vehicle. The methods may further include retrieving, by the device, an instruction from a memory disposed in the vehicle while the memory is in a write-protected mode. The methods may further include evaluating, by the device, the first sensor value and the second sensor value based on the instruction. The methods may further include determining, by the device, that the first sensor value is outside a range associated with the first sensor based on the evaluation. The methods may further include transforming, by the device, the determination into an alarm.

Figure 1:
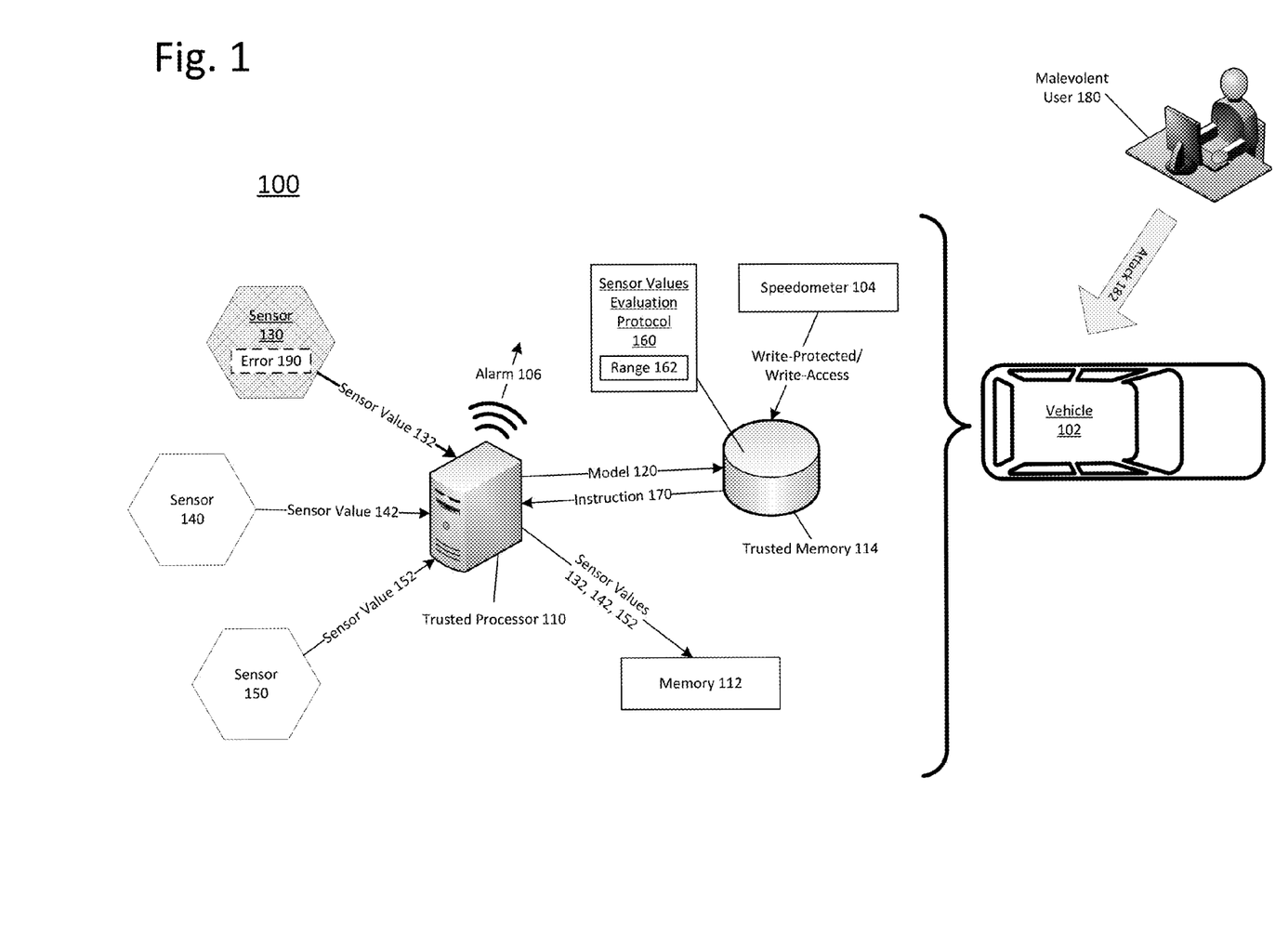
FIG. 1 illustrates an example system that can be utilized to implement a sensor data anomaly detector.

FIG. 1 illustrates an example system 100 that can be utilized to implement a sensor data anomaly detector, arranged in accordance with at least some embodiments described herein. System 100 may be implemented in a vehicle 102. Vehicle 102 may be an autonomous vehicle and may include a speedometer 104. System 100 may include a trusted processor 110, a memory 112, a trusted memory 114, and/or at least one sensor 130, 140, 150. Trusted processor 110 may be configured to be in communication with memory 112, trusted memory 114 and/or sensors 130, 140, 150. Trusted memory 114 may be a read-only-memory (ROM) and may be configured in communication with speedometer 104.

Sensors 130, 140, 150 may each be a location sensor, temperature sensor, infrared sensor, visual sensor, optical sensor, speedometer, radar, etc. Sensors 130, 140, 150 may be configured to convert a physical quantity into sensor values 132, 142, 152, respectively. Sensor values 132, 142, 152 may be sensory data that corresponds to a respective sensor among sensors 130, 140, 150. For example, if sensor 130 is a temperature sensor, sensor value 132 may be temperature data. Sensors 130, 140, 150 may also be configured to send sensor values 132, 142, 152 to trusted processor 110.

Speedometer 104 may be configured to detect whether vehicle 102 is in motion. Speedometer 104 may be configured to activate a write-access mode or a write-protected mode in trusted memory 114 based on the detection of whether vehicle 102 is in motion. In an example, speedometer 104 may determine that vehicle 102 is not in motion. Speedometer 104 may activate write-access mode in trusted memory 114 in response to the determination that vehicle 104 is not in motion. Trusted memory 114 may be a boot loader device so that instructions are stored and loaded from a read only memory. In another example, speedometer 104 may determine that vehicle 102 is in motion. Speedometer 104 may activate write-protected mode in trusted memory 114 in response to the determination that vehicle 104 is in motion. In some examples, other components, such as an engine, a processor, or an accelerator of vehicle 102, may be configured to activate write-access mode or write-protected mode in trusted memory 114. When the write-access mode in trusted memory 114 is activated, trusted processor 110 may store data in trusted memory 114 and/or retrieve data from trusted memory 114. When the write-protected mode in trusted memory 114 is activated, trusted processor 110 may not store data in trusted memory 114 but may retrieve data from trusted memory 114.

Trusted memory 114 may be configured to store a sensor values evaluation protocol 160 while in the write-access mode. Sensor values evaluation protocol 160 may include an instruction 170. Instruction 170 may include procedures for trusted processor 110 to evaluate sensor values 132, 142, 152. Sensor values evaluation protocol 160 may also include a range 162. Range 162 may be associated with an acceptable range of values for one or more sensors values 132, 142, 152. In an example where sensors 130, 140, 150 are different types of sensors, sensor values evaluation protocol 160 may include a respective range for a respective type of sensor and sensor value.

Trusted processor 110 may be configured to receive sensor values 132, 142, 152 from sensors 130, 140, 150 and may store sensor values 132, 142, 152 in memory 112. Trusted processor 110 may be configured to retrieve instruction 170 from sensor values evaluation protocol 160. Trusted processor 110 may be configured to evaluate sensor values 132, 142, 152 in memory 112 based on instruction 170. Trusted processor 110 may be configured to generate an alarm 106 based on an evaluation result of sensor values 132, 142, 152 indicating that at least one of the sensor values is an anomaly or invalid. In some examples, the anomaly may be due to a malfunction of a sensor. In some examples, the anomaly may be due to deliberate actions by a user. Trusted processor 110 may be configured to broadcast alarm 106 inside of vehicle 102 and/or outside of vehicle 102. In some examples, trusted processor 110 may be configured to send alarm 106 to a particular component of vehicle 102 such as one or more sensors among sensors 130, 140, 150 and/or a central processing unit of vehicle 102.

In an example, a malevolent user 180 may perform an attack 182 on at least one sensor among sensors 130, 140, 150. In the example, sensor 130 is attacked as is indicated by the shading. Attack 182 may be a sensor jamming attack, a spoofing attack, a root gaining attack, etc. Sensor value 132 of sensor 130 may be modified in response to malevolent user 180 performing attack 182. In another example, an error 190 may occur in sensor 130 even without attack 182. Error 190 may reflect a hardware failure inside of sensor 130. Sensor value 132 may be modified in response to an occurrence of error 190 in sensor 130.

As discussed in more detail below, trusted processor 110 may receive sensor values 132, 142, 152 when vehicle 102 is in motion. Trusted processor 110 may retrieve instruction 170 from trusted memory 114. Trusted processor 110 may evaluate sensor values 132, 142, 152 based on instruction 170. Trusted processor 110 may determine that sensor value 132 is outside of range 162 based on the evaluation. Trusted processor 110 may transform the determination into alarm 106 such as by generating alarm 106. Alarm 106 may be effective to indicate that sensor value 132 is an anomaly, or invalid and alarm 106 may indicate a need to interrupt operations of sensors 130, 140, 150 and/or vehicle 102.

Figure 2:
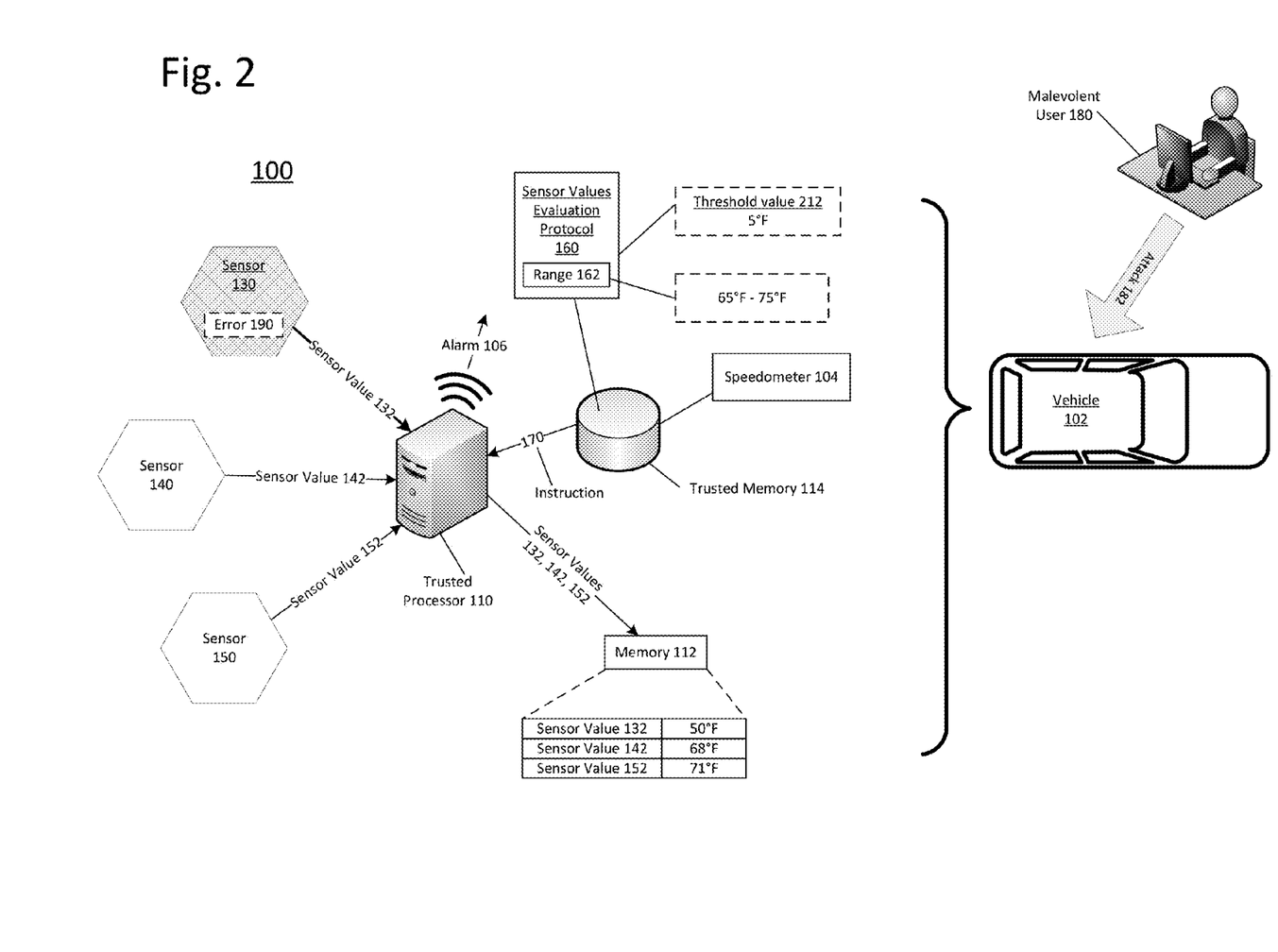
FIG. 2 illustrates the example system of FIG. 1 with additional detail relating to an example evaluation based on a temperature range.

FIG. 2 illustrates the example system of FIG. 1 with additional detail relating to an example evaluation based on a temperature range, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity and brevity.

In an example, when vehicle 102 is in motion, trusted processor 110 may receive sensor values 132, 142, 152 from sensors 130, 140, 150, respectively. Trusted processor 110 may retrieve instruction 170 from sensor values evaluation protocol 160. Trusted processor 110 may evaluate sensor values 132, 142, 152 based on instruction 170. Instruction 170 may include procedures for trusted processor 110 to determine whether sensor values 132, 142, 152 are inside of range 162.

In an example, sensors 130, 140, 150 may be temperature sensors. Sensors 130, 140, 150 may generate sensor values 132, 142, 152, respectively, based on temperature readings recorded by sensors 130, 140, 150. Sensor values 132, 142, 152 received at trusted processor 110 may be "50 degrees", "68 degrees", and "71 degrees", respectively. The value of "50 degrees" of sensor value 132 may be the result of attack 182 attempting to disable or to cause a malfunction of sensor 130 to thereby cause error 190, may be the result of an actual malfunction of sensor 130 to thereby cause error 190 (without sensor 130 actually being attacked by attack 182), and/or may be the result of some other factor(s). Trusted processor 110 may store sensor values 132, 142, 152 in memory 112. Range 162 may be a range of temperatures of between "65° F.-75° F." Trusted processor 110 may determine that sensor value 132 is outside of range 162 (e.g., 50° F. is outside of the range of 65° F.-75° F.). Trusted processor 110 may generate alarm 106 and may associate alarm 106 with sensor 130 in response to the determination that sensor value 132 is outside of range 162. Trusted processor 110 may broadcast alarm 106 inside or outside of vehicle 102.

In another example, instruction 170 may include procedures for trusted processor 110 to evaluate sensor values 132, 142, 152 based on a threshold value 212. Trusted processor 110 may determine whether a difference between each pair of sensor values among sensor values 132, 142, 152 is within a threshold value 212. For example, sensor values 132, 142, 152 received at trusted processor 110 may be "65 degrees", "71 degrees", and "74 degrees", respectively. Trusted processor 110 may evaluate the differences and may store sensor values 132, 142, 152 in memory 112. Threshold value 212 may be a value of "5". Trusted processor 110 may determine that a first difference between sensor value 132 and sensor value 142 is larger than threshold value 212 of "5". Trusted processor 110 may determine that a second difference between sensor value 132 and sensor value 152 is larger than threshold value 212 of "5". Trusted processor 110 may evaluate the differences and may generate alarm 106. Trusted processor 110 may associate alarm 106 with sensor 130 in response to the determination that the first difference and the second difference are larger than threshold value 212. Trusted processor 110 may broadcast alarm 106 inside or outside of vehicle 102.

In some examples, the central processing unit (which may include trusted processor 110 and/or some other processor) of vehicle 102 may detect alarm 106 and may interrupt operations of sensor 130 or may interrupt operations of vehicle 102. In some examples, trusted processor 110 may send alarm 106 to sensor 130 to indicate a need to interrupt operations of sensor 130. In some examples, alarm 106 may be broadcasted outside of vehicle 102 to notify vehicles near vehicle 102 that vehicle 102 may include a defective sensor. In some examples, alarm 106 may be broadcasted outside of vehicle 102 to notify vehicles near vehicle 102 that malevolent user 180 may be performing attack 182 on vehicles in an area that includes vehicle 102.

Figure 3:
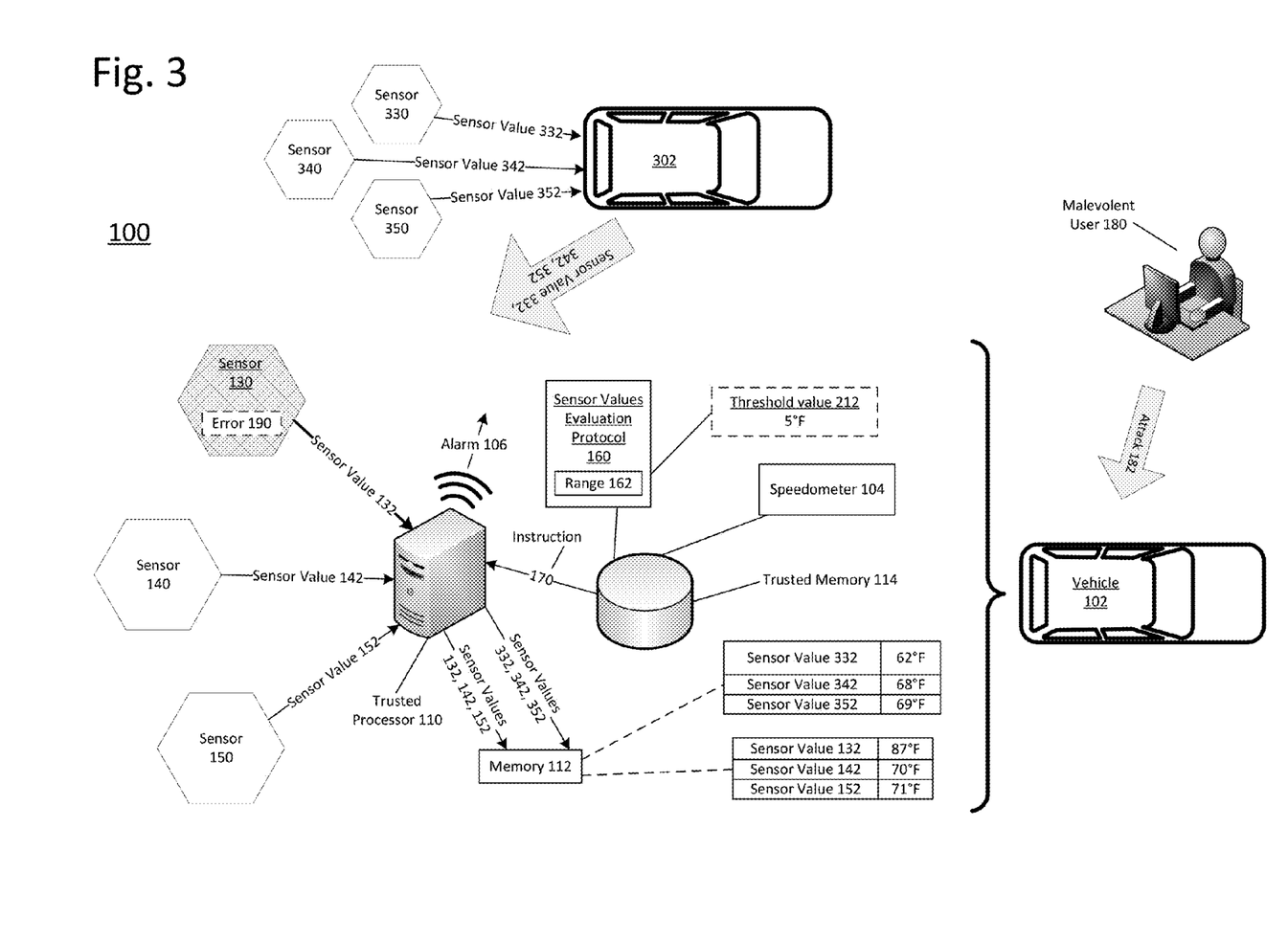
FIG. 3 illustrates the example system of FIG. 1 with additional detail relating to an example evaluation based on sensor values received from additional sensors outside of a vehicle.

FIG. 3 illustrates the example system 100 of FIG. 1 with additional detail relating to an example evaluation based on sensor values received from additional sensors outside of a vehicle, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity and brevity.

System 100 may further include an external sensor source 302 located outside of and apart from a vehicle. One external sensor source 302 may be used to support many vehicles 102. Alternatively, many external sensor sources 302 may be used to support one vehicle 102 or many external sensor sources 302 may be used to support many vehicles 102. External sensor source 302 may be embodied as or located in a vehicle or a depot including at least one or more sensors 330, 340, 350. Sensors 330, 340, 350 may have a higher level of security or reliability than sensors 130, 140, 150.

Sensors 330, 340, 350 may be a same type of sensor as sensors 130, 140, 150, respectively. For example, if sensor 130 is a temperature sensor, sensor 330 may also be a temperature sensor. If sensor 140 is an infrared sensor, sensor 340 may also be an infrared sensor. Sensors 330, 340, 350 may generate sensor values 332, 342, 352, respectively. Sensor values 332, 342, 352 may be sensory data that corresponds to sensors 330, 340, 350. In some examples, more than one external sensor source 302 may be deployed around vehicle 102 to implement system 100. In some examples, more than one external sensor source 302 may be disposed along a predetermined path of vehicle 102 to implement system 100. Trusted processor 110 may determine that one of sensor values 332, 342, 352 is an anomaly in an example where a majority of the sensor values are within a range of values and other sensor values are outside of that range. In another example where sensor values 332, 342, 352 do not clearly indicate whether a particular value is an anomaly, trusted processor 110 may analyze sensor values from external sensor source 302.

In an example, external sensor source 302 may send sensor values 332, 342, 352 to vehicle 102. Trusted processor 110 may receive sensor values 332, 342, 352 and may store sensor values 332, 342, 352 in memory 112. Instruction 170 from sensor values evaluation protocol 160 may include procedures for trusted processor 110 to evaluate sensor values 132, 142, 152 based on sensor values 332, 342, 352. In the example shown, sensors 130, 140, 150, 330, 340, 350 may be temperature sensors. Sensor data 332, 342, 352 received at trusted processor 110 may be "62 degrees", "68 degrees", and "69 degrees", respectively. Threshold value 212 may be a value of "5". Sensor values 132, 142, 152 received at trusted processor 110 may be "87 degrees", "70 degrees", and "71 degrees", respectively. Trusted processor 110 may store sensor values 132, 142, 152, 332, 342, 352 in memory 112.

Trusted processor 110 may determine a first difference between sensor value 132 and sensor value 332. Trusted processor 110 may determine a second difference between sensor value 142 and sensor value 342. Trusted processor 110 may determine a third difference between sensor value 152 and sensor value 352. Trusted processor 110 may evaluate the difference and determine the first difference is larger than threshold value 212. Trusted processor 110 may determine the second and third differences are less than threshold value 212. Trusted processor 110 may generate alarm 106 and associate alarm 106 with sensor 130 in response to the determination that the first difference is larger than threshold value 212. Trusted processor 110 may broadcast alarm 106 inside or outside of vehicle 102.

In an example, when vehicle 102 is in motion, malevolent user 180 may perform attack 182 on speedometer 104. Attack 182 may modify speed data in speedometer 104 to indicate that vehicle 102 is not in motion. Malevolent user 180 may further use attack 182 to attempt to modify parameters, such as range 162, in sensor values evaluation protocol 160. To detect such an attack, trusted processor 110 may be configured to attempt writing a flag to trusted memory 114. When the attempt to write the flag fails, trusted processor 110 may determine that trusted memory 114 is in write-protected mode and thus vehicle 102 should be in motion even though speed data may indicate that vehicle 102 is not in motion. In response to the determination, trusted processor 110 may generate alarm 106 and may associate alarm 106 with speedometer 104. Trusted processor 110 may broadcast alarm 106 inside or outside of vehicle 102.

Figure 4:
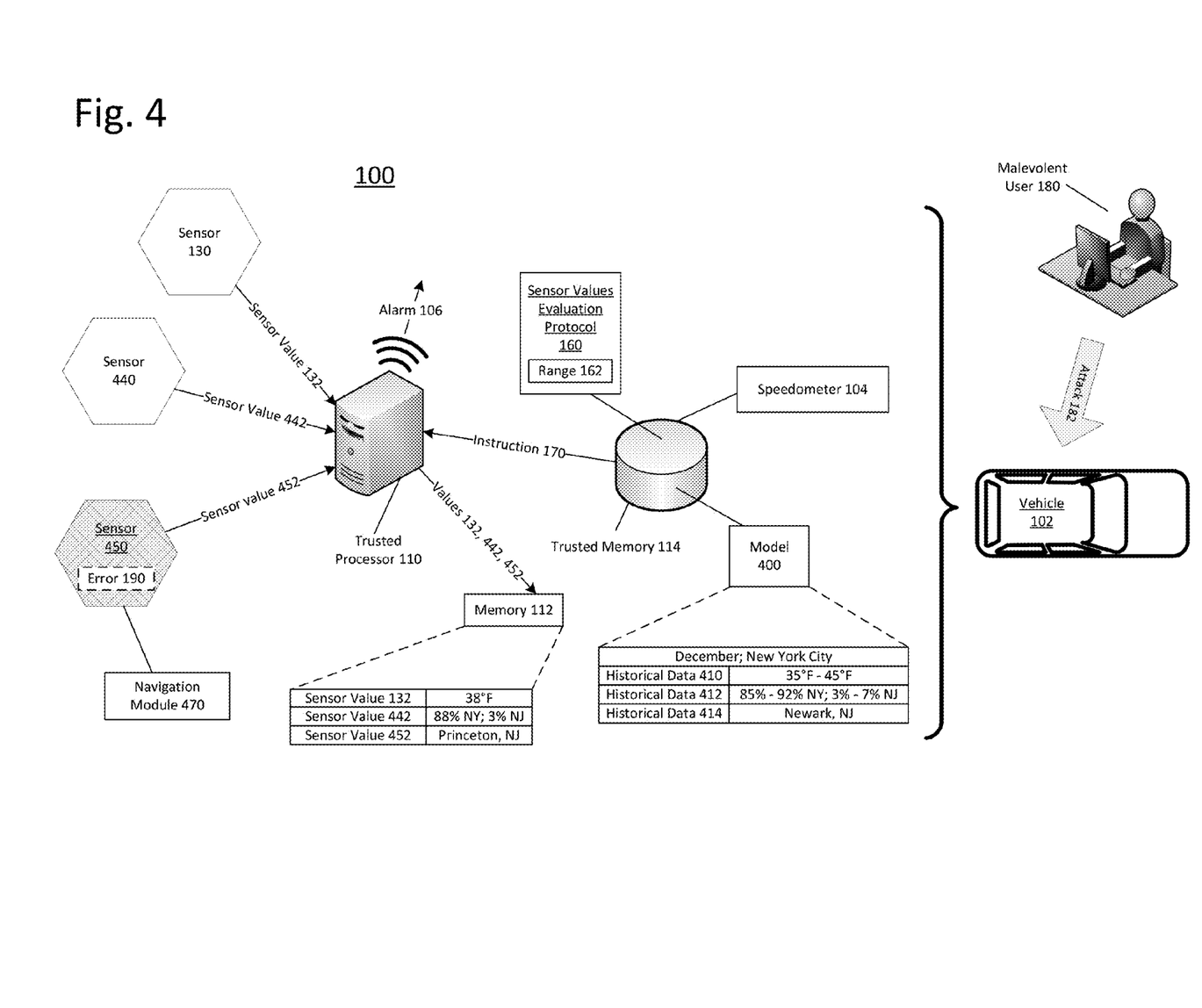
FIG. 4 illustrates the example system of FIG. 1 with additional detail relating to an example evaluation based on a model.

FIG. 4 illustrates the example system 100 of FIG. 1 with additional detail relating to an example evaluation based on a model, arranged in accordance with at least some embodiments described herein. FIG. 4 is substantially similar to system 100 of FIG. 1, with additional details. Those components in FIG. 4 that are labeled identically to components of FIG. 1 will not be described again for the purposes of clarity and brevity.

Trusted processor 110 may be further configured to store a model 400 in trusted memory 114 while the write-access mode in trusted memory 114 is activated. In some examples, model 400 may be generated by trusted processor 110 by compiling received historical data. In some examples, model 400 may be received at trusted processor 110 from an outside source such as a component inside or outside of vehicle 102. Model 400 may include historical data 410, 412, 414. Historical data 410 may correspond to data received at trusted processor 110 from sensor 130. Historical data 412 may correspond to data received at trusted processor 110 from a sensor 440. Historical data 414 may correspond to data received at trusted processor 110 from a sensor 450. Sensors 440, 450 may be disposed inside of vehicle 102. Sensors 440, 450 may generate sensor values 442, 452, respectively. Sensor values 442, 452 may be sensory data that corresponds to sensors 440, 450. In some examples, trusted memory 114 may include more than one model where each model may correspond to a respective location, date, and/or time. For example, model 400 depicted in FIG. 4 may correspond to the location New York City in a month of December.

Trusted processor 110 may receive sensor values 132, 442, 452 and may store sensor values 132, 442, 452 in memory 112. In an example, sensor 130 may be a temperature sensor and sensor value 132 may be temperature data. Sensor 440 may be a visual sensor configured to capture image data of license plates of vehicles near vehicle 102. Sensor value 442 may be data that corresponds to an image of a location name inscribed on a license plate of a vehicle such as a state, province, etc. Sensor 450 may be configured to be in communication with a navigation module 470 of vehicle 102. Sensor 450 may be configured to detect a current location of vehicle 102 based on data in navigation module 470. Sensor value 452 may be location data that corresponds to locations along a path preset by navigation module 470.

Navigation module 470 may preset a path for vehicle 102 to travel from a start location to a destination location. When vehicle 102 is in the process of travelling from the start location to the destination location, trusted processor 110 may periodically receive sensor values 132, 442, 452 from sensors 130, 440, 450. At a particular instant, sensor value 132 may be 38 degrees. Sensor value 442 may be "88% N.Y.; 3% N.J." to indicate that out of the license plates scanned by sensor 440 in a time period, 88% are New York license plates and 3 percent are New Jersey license plates. The time period may be an hour, two hours, or any arbitrary time period. Sensor value 452 may be "Princeton, N.J." to indicate that the current location of vehicle 102 is in Princeton, N.J.

Trusted processor 110 may retrieve instruction 170 from sensor values evaluation protocol 160. Instruction 170 may include procedures for trusted processor 110 to evaluate sensor values 132, 442, 452 based on model 400. Historical data 410 may be a range "35° F. to 45° F." to indicate that the temperature in a current location of vehicle 102 should be between 35 degrees to 45 degrees. Historical data 412 may be "85%-92% N.Y.; 3%-7% N.J." to indicate that 85 percent to 92 percent of vehicles surrounding vehicle 102 should be New York license plates and 3 percent to 7 percent of vehicles surrounding vehicle 102 should be New Jersey license plates. Historical data 414 may be "Newark, N.J." to indicate that the current location of vehicle 102, based on the path preset by navigation module 470, should be near Newark, N.J.

Trusted processor 110 may evaluate sensor value 132 with historical data 410 and may determine that sensor value 132 is consistent with historical data 410. Trusted processor 110 may evaluate sensor value 442 with historical data 412 and may determine that sensor value 442 is consistent with historical data 412. Trusted processor 110 may evaluate sensor value 452 with historical data 414 and may determine that sensor value 452 is inconsistent with historical data 414. Trusted processor 110 may generate alarm 106 and may associate alarm 106 with sensor 450 in response to the determination that sensor value 452 is inconsistent with historical data 414. Trusted processor 110 may generate or cause to be generated alarm 106 inside or outside of vehicle 102 that may indicate that sensor value 452 is an anomaly.

In some examples, trusted processor 110 may update model 400 when write-access mode is activated in trusted memory 114. For examples, trusted processor 110 may store more than one instance of sensor values 132, 442, 452 in memory 112 when write-protected mode is activated in trusted memory 114. Trusted processor 110 may update historical data 410, 412, 414 with the stored instances of sensor values 132, 442, 452 when write-access mode is activated in trusted memory 114 to compile model 400.

In some examples, trusted processor 110 may generate model 400 based on terrain data associated with a location of vehicle 102. Terrain data may include network identifiers, radio station identifiers, available WI-FI networks, etc. For example, trusted processor 110 may receive sensor values 132, 442, 452 and in response, may compile a first list of identifications of WI-FI networks (such as a network name) available to a vehicle. Trusted processor 110 may obtain a second list of identifications of WI-FI networks available to another vehicle and in response, may compare the first and second lists. Trusted processor 110 may detect an anomaly relating to the location of vehicle 102 based on the comparison of the first and second lists.

Among other possible features, a system in accordance with the disclosure may benefit owners and/or users of autonomous vehicles. The system may be able to detect a sensor data anomaly. Detection of sensor data anomaly may allow autonomous vehicles to detect if there are defective sensors. Detection of sensor data anomaly may also enhance performance and safety of autonomous vehicles. For example, a sensor data anomaly in proximity sensors of an autonomous vehicle may lead to accidents. A sensor data anomaly in global positioning systems may lead the autonomous vehicle to an undesired destination. Sensor data anomaly in performance measures such as speed and/or time to destination of an autonomous vehicle may lead to wrong approximations of energy usage such as power and/or gas usage. The system may also provide additional security to vehicle operators in a vehicular ad-hoc network. The system may allow operators of vehicles in the vehicular ad-hoc network to be aware of defective sensors and malicious attacks.

Figure 5:
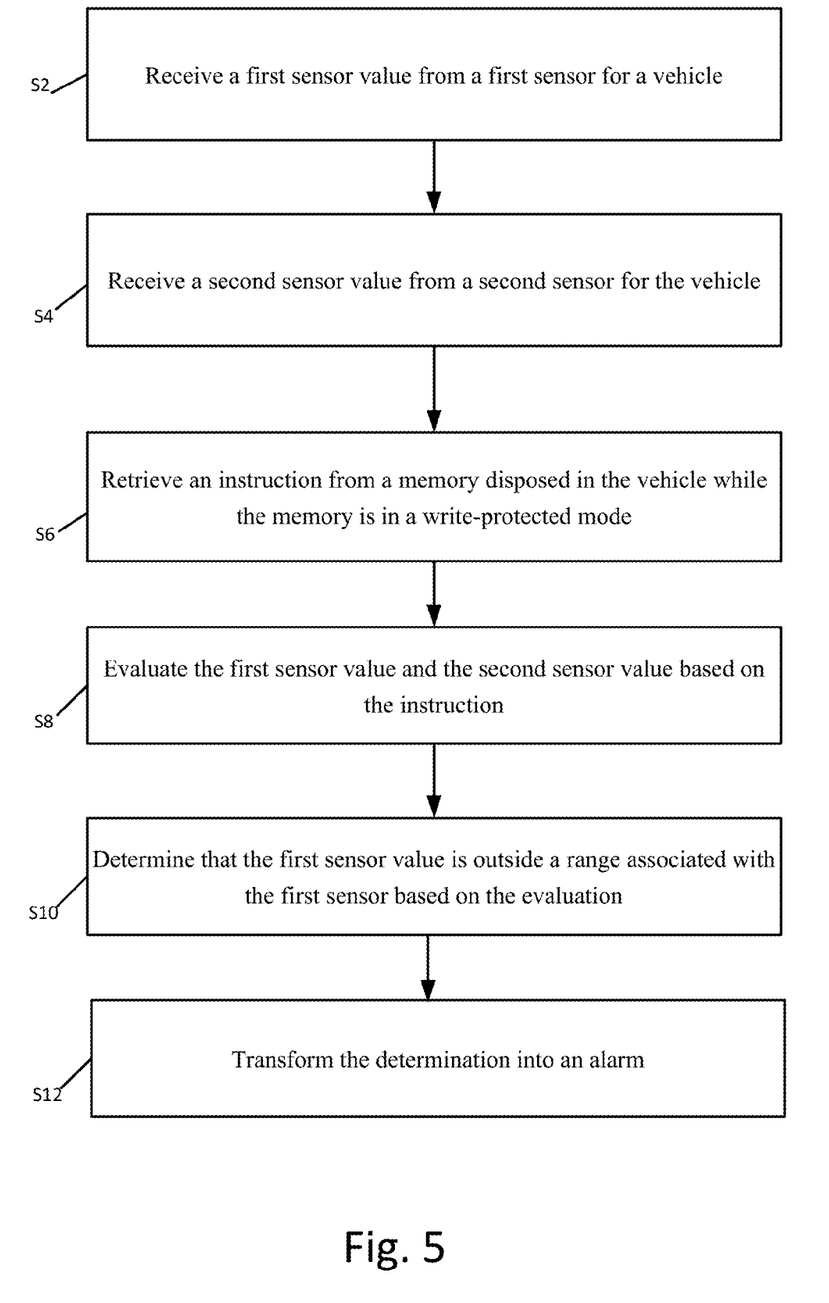
FIG. 5 illustrates a flow diagram for an example process to implement a sensor data anomaly detector.

FIG. 5 illustrates a flow diagram for an example process to implement a sensor data anomaly detector, arranged in accordance with at least some embodiments presented herein. The process in FIG. 5 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation or supplemented with additional blocks representing other operations, actions, or functions.

Processing may begin at block S2, "Receive a first sensor value from a first sensor for a vehicle." A device (such as trusted processor 110, for instance) may receive a first sensor value from a first sensor of a vehicle. In some examples, the first sensor value may relate to a license plate of the vehicle, a temperature or a location.

Processing may continue from block S2 to block S4, "Receive a second sensor value from a second sensor for the vehicle." The device may receive a second sensor value from a second sensor of a vehicle.

Processing may continue from block S4 to block S6, "Retrieve an instruction from a memory disposed in the vehicle while the memory is in a write-protected mode." The device may retrieve an instruction from a memory while the memory is in a write-protected mode. The write-protect mode may be activated by the device while the vehicle is in motion. The memory may be disposed in the vehicle. The device may activate a write-access mode while the vehicle is not in motion. The device may store the instruction in the memory while the memory is in the write-access mode and prior to receipt of the first sensor value and the second sensor value.

Processing may continue from block S6 to block S8, "Evaluate the first sensor value and the second sensor value based on the instruction." The device may evaluate the first sensor value and the second sensor value based on the instruction. In some examples, the instruction may include procedures for the device to evaluate the first sensor value and the second sensor value based on a threshold value and/or a model. The model may be generated or received by the device. In some examples, the device may receive third sensor data from a third sensor. The third sensor may be disposed inside or outside of the vehicle. The third sensor value may relate to a license plate of the vehicle. The device may determine a first difference between the first sensor value and the third sensor value. The device may determine a second difference between the second sensor value and the third sensor value. The processor may determine that the first sensor value is outside the range based on the evaluation of the first difference and the second difference.

Processing may continue from block S8 to block S10, "Determine that the first sensor value is outside a range associated with the first sensor based on the evaluation." The device may determine that the first sensor value is outside of a range associated with the first sensor based on the evaluation of the first sensor value and the second sensor value. In some examples, determination of the first sensor value being outside of the range may be based on first historical data that corresponds to the first sensor in the model stored in the memory. The model may further include second historical data that corresponds to the second sensor.

Processing may continue from block S10 to block S12, "Transform the determination into an alarm." The device may transform the determination that the first sensor value is outside of the range into an alarm.

Figure 6:
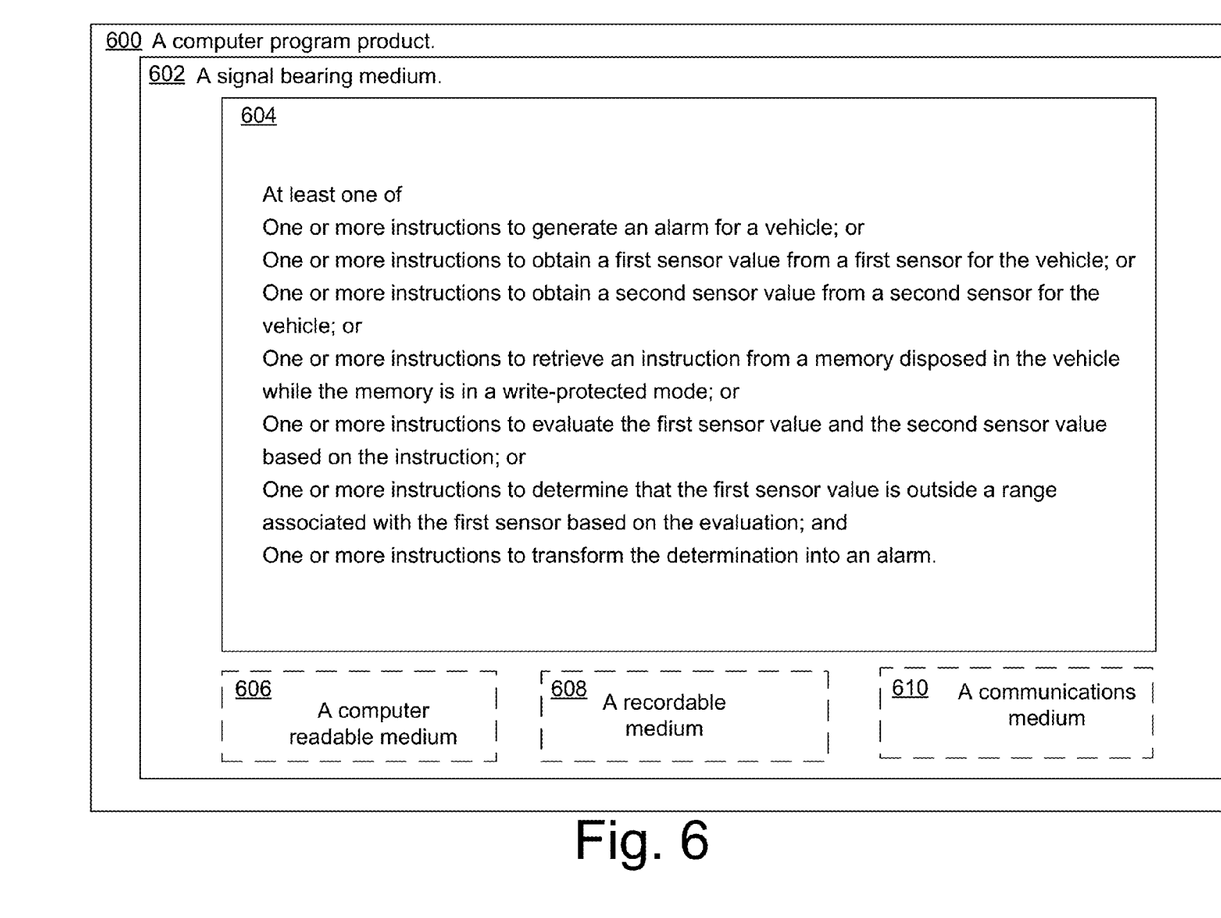
FIG. 6 illustrates an example computer program product that can be utilized to implement a sensor data anomaly detector.

FIG. 6 illustrates an example computer program product 600 that can be utilized to implement a sensor data anomaly detector, arranged in accordance with at least some embodiments described herein. Computer program product 600 may include a signal bearing medium 602. Signal bearing medium 602 may include one or more instructions 604 that, in response to execution by, for example, a processor, may provide the functionality described above with respect to FIGS. 1-5, including obtaining the first and second sensor values, etc. Thus, for example, referring to system 100, trusted processor 110 may undertake one or more of the blocks shown in FIG. 5 in response to execution of instructions 604 conveyed to the system 100 by signal bearing medium 602.

In some implementations, signal bearing medium 602 may encompass a computer-readable medium 606, such as, but not limited to, a hard disk drive (HDD), a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). Thus, for example, computer program product 600 may be conveyed to one or more modules of the system 100 by an RF signal bearing medium 602, where the signal bearing medium 602 is conveyed by a wireless communications medium 610 (e.g., a wireless communications medium conforming with the IEEE 802.11 standard).

Figure 7:
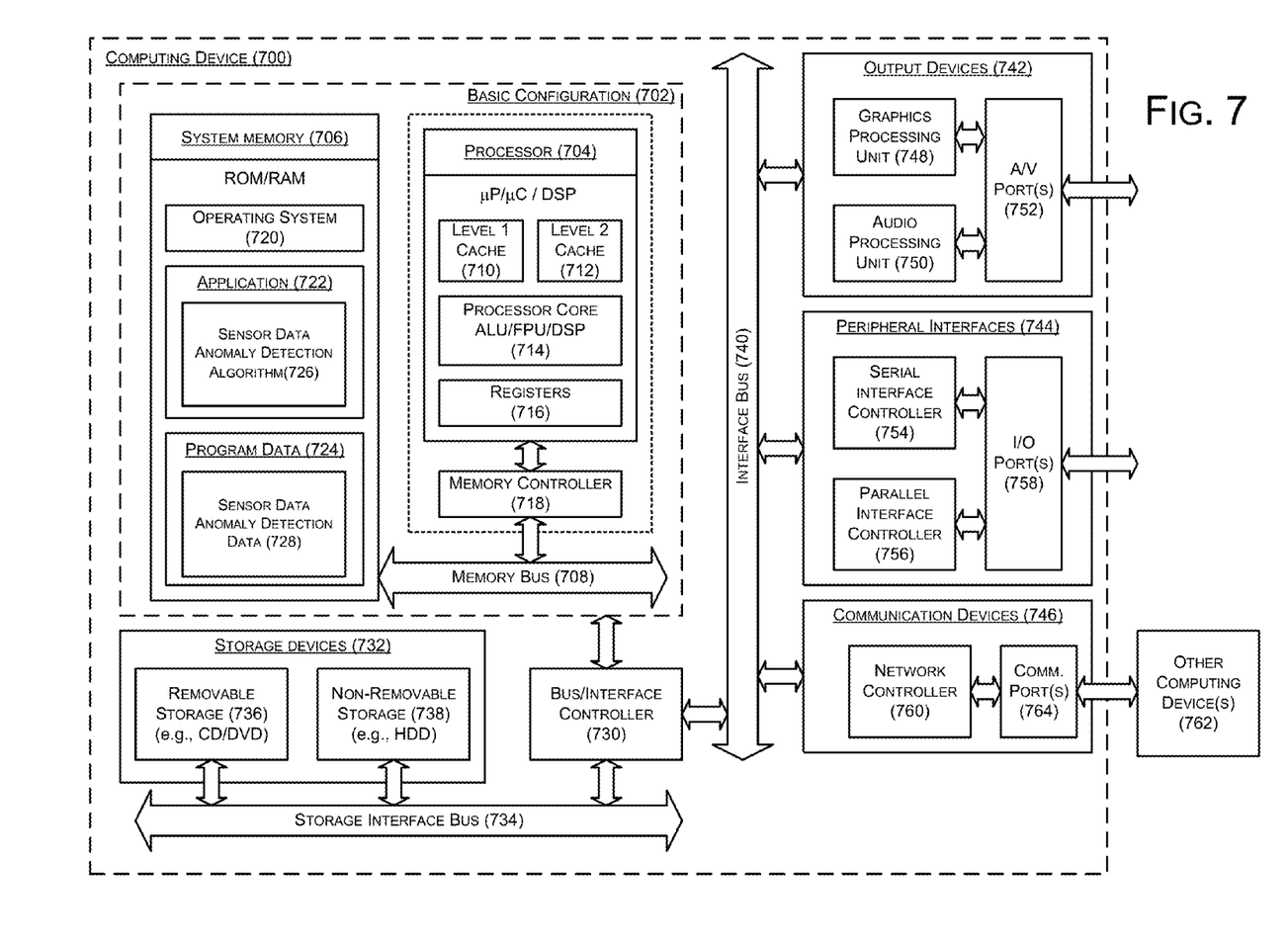
FIG. 7 is a block diagram illustrating an example computing device that is arranged to implement a sensor data anomaly detector.

FIG. 7 is a block diagram illustrating an example computing device 700 that is arranged to implement a sensor data anomaly detector, arranged in accordance with at least some embodiments described herein. In a very basic configuration 702, computing device 700 typically includes one or more processors 704 (such as trusted processor 110) and a system memory 706 (such as trusted memory 114). A memory bus 708 may be used for communicating between processor 704 and system memory 706.

Depending on the desired configuration, processor 704 may be of any type including but not limited to a microprocessor (IP), a microcontroller (μC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with processor 704, or in some implementations, memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a sensor data anomaly detection algorithm 726 (such as sensor values evaluation protocol 160) that is arranged to perform the functions and operations as described herein including those described with respect to system 100 of FIGS. 1-5. Program data 724 may include sensor data anomaly detection data 728 (such as sensor values 132, 142, 152, 332, 342, 352, 442, 452) that may be useful for implementation of a sensor data anomaly detector as is described herein. In some embodiments, application 722 may be arranged to operate with program data 724 on operating system 720 such that implementations of a sensor data anomaly detector may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. The terminology used herein is for the purpose of describing particular embodiments only, and is not intended to be limiting.

With respect to the use of substantially any plural and/or singular terms herein, one can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended to mean, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended to mean, e.g., "a system having at least one of A, B, or C" would include but not be limited to systems that have A alone, B alone, C alone, A and B together, A and C together, B and C together, and/or A, B, and C together, etc. Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate an alarm for a vehicle, the method comprising, by a device:
    receiving a first sensor value from a first sensor for the vehicle;
    receiving a second sensor value from a second sensor for the vehicle;
    receiving a model, wherein the model includes historical data that corresponds to the first sensor;
    storing the model in a memory, disposed in the vehicle, while the memory is in a write-access mode;
    retrieving an instruction from the memory disposed in the vehicle while the memory is in a write-protected mode;
    evaluating the first sensor value and the second sensor value based on the instruction;
    determining a difference between the first sensor value and the historical data;
    determining that the first sensor value is outside a range associated with the first sensor based on the evaluation and based on the difference, wherein the range is based on the historical data that corresponds to the first sensor; and
    transforming the determination that the first sensor value is outside the range, into the alarm.

2. The method of claim 1, further comprising, prior to receiving the first and second sensor values, by the device, storing the instruction in the memory, while the memory is in the write-access mode.

3. The method of claim 2, further comprising:
    activating the write-access mode, while the vehicle is stopped; and
    activating the write-protected mode, while the vehicle is in motion.

4. The method of claim 1, wherein the instruction includes a threshold value, and wherein determining that the first sensor value is outside the range comprises comparing a difference between the first and second sensor values with the threshold value.

5. The method of claim 1, wherein the vehicle includes a first vehicle and wherein the method further comprises, by the device:
    receiving a third sensor value from a third sensor in a second vehicle;
    determining a first difference between the first sensor value and the third sensor value;
    determining a second difference between the second sensor value and the third sensor value; and
    evaluating the first difference and the second difference based on the instruction,
    wherein determining that the first sensor value is outside the range is further based on the evaluation of the first difference and the second difference.

6. The method of claim 1, wherein receiving each of the first sensor value and the second sensor value comprises receiving a value corresponding to a location of the vehicle.

7. The method of claim 6, wherein retrieving the instruction includes retrieving procedures that correspond to changes in the range as the vehicle moves in a path from a start location to a destination location.

8. A method to generate an alarm for a vehicle, the method comprising, by a device:
    receiving a first sensor value from a first sensor for the vehicle;
    receiving a second sensor value from a second sensor for the vehicle;
    receiving first historical data that corresponds to the first sensor;
    receiving second historical data that corresponds to the second sensor;
    compiling the first historical data and the second historical data to generate a model;
    storing the model in a memory, disposed in the vehicle, while the memory is in a write-access mode;
    determining a first difference between the first sensor value and the first historical data;
    determining a second difference between the second sensor value and the second historical data;
    retrieving an instruction from the memory, disposed in the vehicle, while the memory is in a write-protected mode;
    evaluating the first sensor value and the second sensor value based on the instruction;
    evaluating the first difference and the second difference based on the instruction;
    determining that the first sensor value is outside a range associated with the first sensor based on the evaluation of the first sensor value and the second sensor value, and further based on the evaluation of the first difference and the second difference, wherein the range is based on the first historical data that corresponds to the first sensor; and transforming the determination that the first sensor value is outside the range, into the alarm.

9. A method to generate an alarm for a vehicle, the method comprising, by a device:
receiving a first sensor value from a first sensor for the vehicle;
receiving a second sensor value from a second sensor for the vehicle;
receiving a third sensor value from a third sensor outside of the vehicle;
determining a first difference between the first sensor value and the third sensor value;
determining a second difference between the second sensor value and the third sensor value;
retrieving an instruction from a memory, disposed in the vehicle, while the memory is in a write-protected mode;
evaluating the first sensor value and the second sensor value based on the instruction;
evaluating the first difference and the second difference based on the instruction;
determining that the first sensor value is outside a range associated with the first sensor based on the evaluation of the first sensor value and the second sensor value and further based on the evaluation of the first difference and the second difference, wherein the range is based on historical data that corresponds to the first sensor; and
transforming the determination that the first sensor value is outside the range, into the alarm.

10. The method of claim 9, wherein receiving the third sensor value from the third sensor outside of the vehicle comprises receiving a value corresponding to a license plate of the vehicle.

11. The method of claim 9, wherein receiving the third sensor value from the third sensor includes receiving the third sensor value from another vehicle in which the third sensor is located.

12. A system configured to generate an alarm for a vehicle, the system comprising:
a first sensor for the vehicle;
a second sensor for the vehicle; and
a processor configured to be in communication with the first sensor and the second sensor, wherein the processor is configured to perform or cause a device to perform:
store a model in a memory, while the memory is in a write-access mode, wherein the model includes historical data that corresponds to the first sensor;
retrieve an instruction from the memory, while the memory is in a write-protected mode;
evaluate, based on the instruction, a first sensor value from the first sensor and a second sensor value from the second sensor;
determine a difference between the first sensor value and the historical data;
determine that the first sensor value is outside a range associated with the first sensor based on the evaluation and based on the difference, wherein the range is based on the historical data that corresponds to the first sensor; and
transform the determination that the first sensor value is outside the range, into the alarm.

13. The system of claim 12, wherein the processor is further configured to perform or cause the device to perform:
store the instruction in the memory, while the memory is in the write-access mode.

14. The system of claim 13, wherein each of the first sensor value and the second sensor value corresponds to a location of the vehicle and wherein the instruction includes procedures that correspond to changes in the range as the vehicle moves in a path from a start location to a destination location.

15. The system of claim 12, further comprising:
a speedometer configured to be in communication with the memory,
wherein the speedometer is configured to detect a speed of the vehicle, and
wherein the processor is configured to, based on the speed, perform or cause the device to perform:
activate the write-access mode, while the vehicle is stopped; and
activate the write-protected mode, while the vehicle is in motion.

16. The system of claim 12, wherein the instruction includes a threshold value, and the determination that the first sensor value is outside the range comprises a comparison of a difference between the first sensor value and second sensor value with the threshold value.

17. A system configured to generate an alarm for a vehicle, the system comprising:
a first sensor for the vehicle;
a second sensor for the vehicle; and
a processor configured to be in communication with the first sensor and the second sensor, wherein the processor is configured to perform or cause a device to perform:
store an instruction in a memory, while the memory is in a write-access mode;
retrieve the instruction from the memory, while the memory is in a write-protected mode;
evaluate, based on the instruction, a first sensor value from the first sensor and a second sensor value from the second sensor;
determine a first difference between the first sensor value and a third sensor value from a third sensor outside of the vehicle;
determine a second difference between the second sensor value and the third sensor value; and
evaluate, based on the instruction, the first difference and the second difference
determine that the first sensor value is outside a range associated with the first sensor based on the evaluation of the first sensor value and the second sensor value and further based on the evaluation of the first difference and the second difference, wherein the range is based on historical data that corresponds to the first sensor; and
transform the determination that the first sensor value is outside the range, into the alarm.

18. A device configured to generate an alarm for a vehicle, the device comprising:
a memory;
a processor configured to be in communication with the memory, wherein the processor is configured to perform or cause the device to perform:

store a model in the memory, while the memory is in a write-access mode, wherein the model includes historical data that corresponds to a first sensor for the vehicle;

in response to an instruction from the memory while the memory is in a write protected mode, evaluate a first sensor value from the first sensor for the vehicle and a second sensor value from a second sensor for the vehicle;

determine a difference between the first sensor value and the historical data;

determine that the first sensor value is outside a range associated with the first sensor based on the evaluation and based on the difference, wherein the range is based on the historical data that corresponds to the first sensor; and transform the determination that the first sensor value is outside the range, into the alarm to indicate that the first sensor value is an anomaly.

19. The device of claim 18, wherein the first sensor is located in the vehicle and the second sensor is located outside of and apart from the vehicle.

* * * * *

UNITED STATES PATENT AND TRADEMARK OFFICE
CERTIFICATE OF CORRECTION

PATENT NO. : 9,764,712 B2
APPLICATION NO. : 15/117375
DATED : September 19, 2017
INVENTOR(S) : Ur et al.

It is certified that error appears in the above-identified patent and that said Letters Patent is hereby corrected as shown below:

In the Specification

In Column 10, Line 48, delete "(IP)," and insert -- (µP), --, therefor.

In Column 13, Line 3, delete "general such" and insert -- general, such --, therefor.

In the Claims

In Column 13, Line 61, in Claim 1, delete "vehicle while" and insert -- vehicle, while --, therefor.

In Column 14, Line 21, in Claim 5, delete "vehicle and" and insert -- vehicle, and --, therefor.

In Column 16, Line 9, in Claim 14, delete "vehicle and" and insert -- vehicle, and --, therefor.

In Column 16, Line 52, in Claim 17, delete "difference" and insert -- difference; --, therefor.

Signed and Sealed this
Twenty-fourth Day of April, 2018

Andrei Iancu
*Director of the United States Patent and Trademark Office*